(12) United States Patent
Liu et al.

(10) Patent No.: US 11,833,491 B2
(45) Date of Patent: Dec. 5, 2023

(54) SYNTHESIS METHOD OF G-C3N4/C COMPOSITE MATERIAL BASED ON HOLLYHOCK STALK

(71) Applicant: Suzhou University of Science and Technology, Suzhou (CN)

(72) Inventors: Chengbao Liu, Suzhou (CN); Fei Tang, Suzhou (CN); Tao Jin, Suzhou (CN); Feng Chen, Suzhou (CN); Junchao Qian, Suzhou (CN); Zhigang Chen, Suzhou (CN)

(73) Assignee: Suzhou University of Science and Technology, Suzhou (CN)

( * ) Notice: Subject to any disclaimer, the term of this patent is extended or adjusted under 35 U.S.C. 154(b) by 0 days.

(21) Appl. No.: 17/866,889

(22) Filed: Jul. 18, 2022

(65) Prior Publication Data
US 2023/0201811 A1 Jun. 29, 2023

(30) Foreign Application Priority Data
Dec. 29, 2021 (CN) .......................... 202111635860.9

(51) Int. Cl.
*B01J 27/26* (2006.01)
*B01J 21/18* (2006.01)
(Continued)

(52) U.S. Cl.
CPC ............... *B01J 27/26* (2013.01); *B01J 21/18* (2013.01); *B01J 35/004* (2013.01);
(Continued)

(58) Field of Classification Search
CPC . B01J 27/26; B01J 21/18; B01J 35/004; B01J 37/0203; B01J 37/0207; B01J 37/06;
(Continued)

(56) References Cited

FOREIGN PATENT DOCUMENTS

| CN | 103745836 A | * | 4/2014 | ............ H01G 11/86 |
| CN | 106513027 A | * | 3/2017 | .............. B01J 27/24 |

(Continued)

*Primary Examiner* — Patricia L. Hailey
(74) *Attorney, Agent, or Firm* — Fresh IP PLC; John R. Bednarz (57) ABSTRACT

The present disclosure provides a synthesis method of a g-$C_3N_4$/C composite material based on a hollyhock stalk, including the following steps: (1) pretreatment of hollyhock stalks; and (2) fabrication of the g-$C_3N_4$/C composite material. In this method, with the hollyhock stalk as a carbon skeleton, g-$C_3N_4$ is spread on a template surface to form a laminated layer, and a composite system with a special structure is constructed. Compared with pure phase g-$C_3N_4$, the composite material substantially increases specific surface area and has a clear interface; the carbon skeleton not only functions as a rigid support, but also increases the electron transfer efficiency of the composite material, thereby improving the separation efficiency of photogenerated carriers and the utilization rate of visible light. Raw materials used in the method are inexpensive and environmentally friendly, which can be used for industrial production and bulk production of eco-friendly materials for harnessing environmental organic pollutants.

5 Claims, 6 Drawing Sheets (51) Int. Cl.
  *B01J 35/00*    (2006.01)
  *B01J 37/02*    (2006.01)
  *B01J 37/06*    (2006.01)
  *B01J 37/08*    (2006.01)
  *C02F 1/30*     (2023.01)
  *C02F 1/72*     (2023.01)
  *C02F 101/30*   (2006.01)

(52) U.S. Cl.
  CPC ....... *B01J 37/0203* (2013.01); *B01J 37/0207* (2013.01); *B01J 37/06* (2013.01); *B01J 37/084* (2013.01); *C02F 1/30* (2013.01); *C02F 1/725* (2013.01); *C02F 2101/308* (2013.01); *C02F 2305/10* (2013.01)

(58) Field of Classification Search
  CPC . B01J 37/084; C02F 1/30; C02F 1/725; C02F 2101/308; C02F 2305/10; C01B 21/0605
  USPC ....................................................... 502/175
  See application file for complete search history.

(56) References Cited

FOREIGN PATENT DOCUMENTS

| | | | | | |
|---|---|---|---|---|---|
| CN | 107121466 | A | * | 9/2017 | ........... G01N 27/308 |
| CN | 109647475 | A | * | 4/2019 | .............. B01J 27/24 |
| CN | 111151286 | A | * | 5/2020 | |
| CN | 114188521 | A | * | 3/2022 | ........ H01M 10/0525 |
| CN | 114188554 | A | * | 3/2022 | .......... H01M 4/9803 |
| MY | 190658 | A | * | 5/2022 | .............. C01B 21/06 |

* cited by examiner

SYNTHESIS METHOD OF G-C3N4/C COMPOSITE MATERIAL BASED ON HOLLYHOCK STALK

CROSS REFERENCE TO RELATED APPLICATION

This patent application claims the benefit and priority of Chinese Patent Application No. 202111635860.9, filed on Dec. 29, 2021, the disclosure of which is incorporated by reference herein in its entirety as part of the present application.

TECHNICAL FIELD

The present disclosure relates to the field of material synthesis, in particular to a synthesis method of a $g$-$C_3N_4$/C composite material based on a hollyhock stalk.

BACKGROUND ART

As an inorganic non-metallic semiconductor photocatalytic material, graphitic carbon nitride ($g$-$C_3N_4$) has received extensive attention in the fields of environmental governance and clean energy due to its unique energy band structure and crystal structure characteristics. However, single-phase $g$-$C_3N_4$ has problems such as a small response range to sunlight, small specific surface area, few reactive sites, and easy recombination of photo-induced electron-hole pairs, which limit its large-scale utilization in the field of photocatalysis.

Hollyhock stalk has a natural biological structure, which can provide rigid skeleton support for $g$-$C_3N_4$, so that the precursor can crystallize along the surface of the stalk, forming a special tubular morphology macroscopically. Meanwhile, the surface of the stalk is uneven, which can avoid the agglomeration of $g$-$C_3N_4$ laminates formed during the thermal polymerization of the precursor. The fabricated composite material has a loose structure and is porous, and its specific surface area is substantially improved.

After the literature retrieval of the prior art, there are some patent reports on the fabrication of $g$-$C_3N_4$/C composite materials. Chinese Patent Application No. CN201610873847.X is titled "CELLULOSE-BASED THREE-DIMENSIONAL POROUS $g$-$C_3N_4$/C AEROGEL AND PREPARATION METHOD THEREOF". This patent loads melamine on cellulose aerogel, and adopts high temperature calcination to convert the melamine into graphitic carbon nitride for vapor deposition on carbon aerogel to form a three-dimensional porous $g$-$C_3N_4$/C aerogel. The resulting three-dimensional porous $g$-$C_3N_4$/C aerogel is easy to recycle, and has a uniform pore size and a large specific surface area, but the fabrication method is cumbersome, and the subsequent loading of the third-phase photocatalyst is difficult, which is not conducive to multi-phase composite. Chinese Patent Application No. CN202010046036.9 is titled "FABRICATION METHOD OF NITROGEN VACANCY-CONTAINING $g$-$C_3N_4$/C COMPOSITE MATERIAL". The patent fabricates a nitrogen vacancy-containing $g$-$C_3N_4$/C composite material by common calcination method. The nitrogen vacancy-containing $g$-$C_3N_4$/C composite material fabricated by this invention has excellent catalytic performance for photocatalytic nitrogen fixation, but the fabrication method is relatively common, and the fabricated material does not have a relatively special microscopic morphology.

SUMMARY

To solve the above problems existing in the prior art, an objective of the present disclosure is to provide a synthesis method of a $g$-$C_3N_4$/C composite material based on a hollyhock stalk. In the present disclosure, a $g$-$C_3N_4$/C composite material with a special morphology is constructed by means of a biological natural template structure, $g$-$C_3N_4$ laminates obtained are thin and uniform, which substantially increase the specific surface area relative to bulk $g$-$C_3N_4$, enhance the visible light absorption of the composite material, promote the separation of photo-induced electrons and holes, improve utilization efficiency of light energy, and thus achieve the effect of improving photocatalytic activity.

To achieve the above objective, the present disclosure provides the following technical solution:

a synthesis method of a $g$-$C_3N_4$/C composite material based on a hollyhock stalk, including the following steps:

step 1, pretreatment of hollyhock stalks cutting freshly picked hollyhock stalks into segments, washing stalk segments with deionized water for many times, and soaking the stalk segments in a pretreatment solution to remove chlorophyll and bioactive substances therein; after soaking, washing the stalks with deionized water and drying naturally, avoiding direct sunlight, and collecting dried stalks for later use;

step 2, fabrication of the $g$-$C_3N_4$/C composite material using dicyandiamide as a precursor to prepare an impregnation solution, impregnating the stalks pretreated in step 1 in the impregnation solution for treatment, and conducting dehydration and heat treatment to generate the $g$-$C_3N_4$/C composite material, where the hollyhock stalks and the dicyandiamide have a mass ratio of (1:1)-(1:4).

Further, the stalk segments in step 1 may be 3-5 cm in length.

Further, the pretreatment solution in step 1 may be a mixture of water and ethanol in a volume ratio of (1:1)-(1:2) and the pretreatment solution may be adjusted to a pH of 2-3 with 0.1 mol/L dilute hydrochloric acid; soaking time may be 3-4 weeks; after soaking, the stalks may be washed until a pH value of a washing solution is neutral prior to air-drying.

Further, the stalks pretreated in step 2 is stirred in the impregnation solution in a 50° C. water bath for 1-2 h, stirring is stopped after the precursor is completely dissolved, and the stalks are kept holding in the water bath for 20-24 h and dried at 60-80° C. overnight.

Further, the heat treatment in step 2 may be conducted in a muffle furnace, and reaction conditions may be as follows: heating to 500-550° C. at 3-5° C./min in an air atmosphere and holding for 4-6 h.

Beneficial effects: The present disclosure provides a synthesis method of a $g$-$C_3N_4$/C composite material based on a hollyhock stalk. In the present disclosure, the microstructure is improved in view of calcination of a $g$-$C_3N_4$ photocatalytic material with dicyandiamide as a precursor in the prior art. Pure phase $g$-$C_3N_4$ has problems such as easy overlapping and agglomeration of a lamellar structure, and a relatively small specific surface area, resulting in high photo-generated carrier recombination rate and low utilization efficiency of light energy. The hollyhock stalk is used as a template to provide a rigid support structure for the composite material, and a carbon skeleton can provide an electron transfer channel for the composite material, increase the recombination efficiency of photogenerated carriers, and thus improve the photocatalytic performance of the material. The advantage is that the catalytic material has a special microscopic morphology and a clear interface, which can realize the effective separation of photogenerated carriers and improve the utilization efficiency of light energy, and has a high ability to degrade organic pollutants under the excitation of visible light. When lighting time lasts for 120 min, the degradation rate of 20 mg/L Rhodamine B is close to 53.91%, which far exceeds the photocatalytic performance of single-phase biochar and graphitic carbon nitride, and substantially improves the utilization efficiency of graphitic carbon nitride. The catalytic material is easy to synthesize and low-cost in raw materials, can be mass-produced, and is a clean, efficient and low-energy-consumption organic pollutant treatment material suitable for industrial popularization and application.

BRIEF DESCRIPTION OF THE DRAWINGS

FIG. 5(a) is a curve chart of the degradation of RhB dye by a g-$C_3N_4$/C composite material for 4 cycles; (b) is an XRD pattern of the g-$C_3N_4$/C composite material before and after the cyclic photocatalysis experiment;

DETAILED DESCRIPTION OF THE EMBODIMENTS

The present disclosure will be further described in detail and completely below in conjunction with the examples, but does not limit the content of the present disclosure.

Example 1

(1) Washed hollyhock stalks were cut into segments (3 cm), soaked in a pretreatment solution (the volume ratio of water to ethanol was 1:1, the solution was adjusted to pH 2 with 0.1 mol/L dilute hydrochloric acid, and the soaking time was 3-4 weeks) to remove chlorophyll and bioactive substances therein; after soaking, the stalks were washed with deionized water and dried naturally, direct sunlight was avoided, and dried stalks were collected for later use;

(2) 1.5 g of pretreated dry hollyhock stalks and 3 g of dicyandiamide were dissolved in 50 mL of deionized water, and stirred in a 50° C. water bath for 1 h; stirring was stopped until the dicyandiamide was completely dissolved; the mixture was held in the 50° C. water bath for 24 h, transferred to an alumina crucible and dried at 60° C. overnight;

(3) the resulting solid was placed in a muffle furnace, heated to 550° C. at 3° C./min in an air atmosphere and held for 4 h, calcinated and then ground to obtain a g-$C_3N_4$/C composite material.

Figure 1:
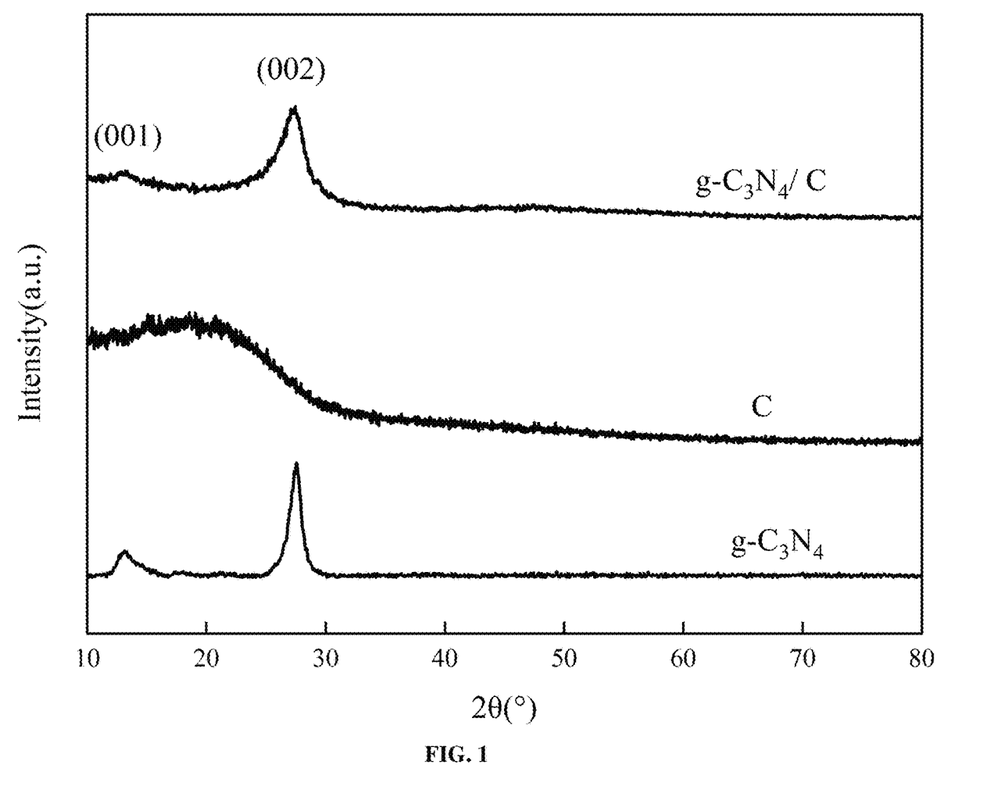
FIG. 1 is an X-ray diffraction (XRD) pattern of a g-$C_3N_4$/C composite material.
Figure 2:
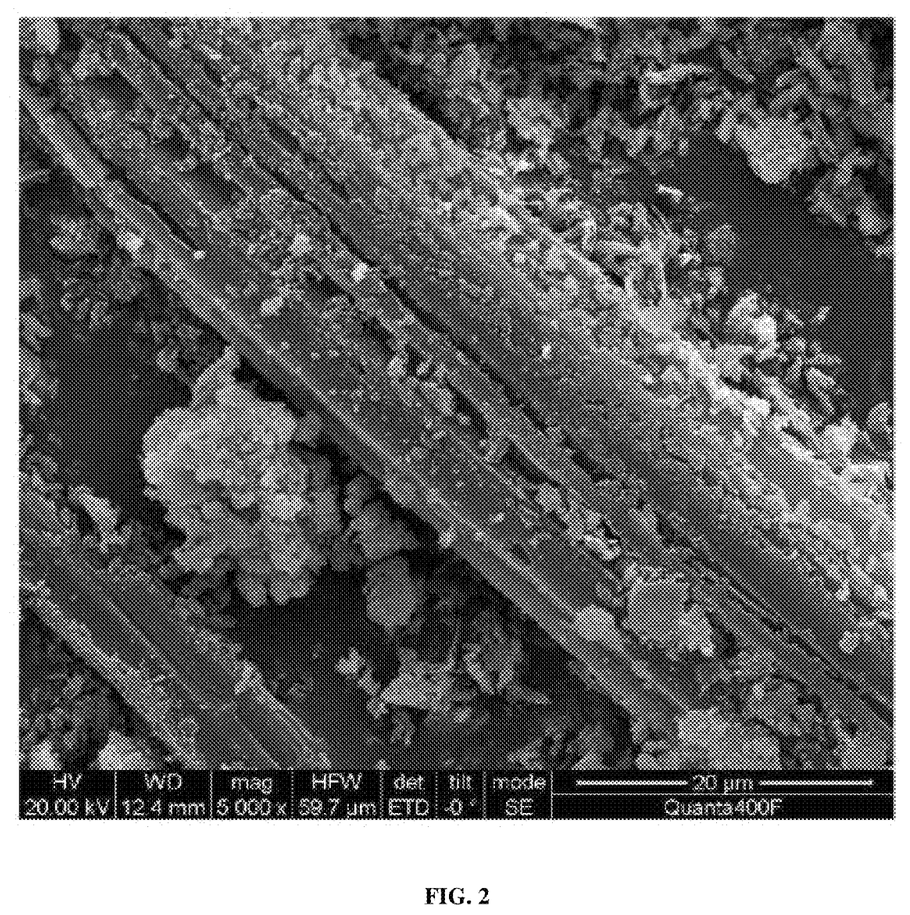
FIG. 2 is a scanning electron micrograph (SEM image) of a g-$C_3N_4$/C composite material.
Figure 3:
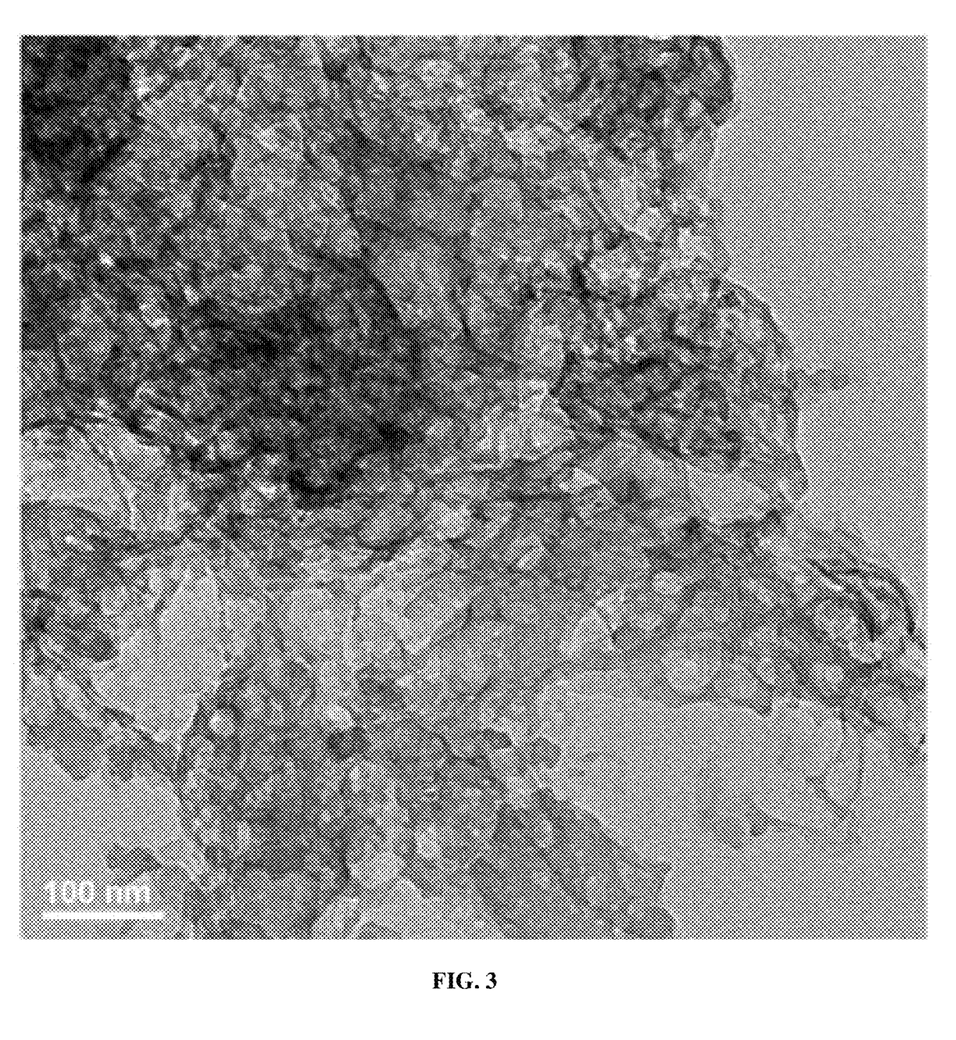
FIG. 3 is a transmission electron micrograph (TEM image) of a g-$C_3N_4$/C composite material.

FIG. 1 is an XRD pattern of the g-$C_3N_4$/C composite material. It can be seen from the figure that the g-$C_3N_4$ phase (002) is more obvious, the peak shape is sharp, and the C phase (001) is not obvious. The main reason is that the C phase is mainly amorphous and the crystallization peak is not obvious. In FIG. 2, the carbon skeleton structure of the hollyhock stalk template and the g-$C_3N_4$ sheets supported on the surface of the template can be clearly seen in the SEM image, and the TEM image of FIG. 3 shows that the g-$C_3N_4$ sheet has a porous structure, with a large specific surface area, which can effectively promote the binding of organic dyes to chemical reactive sites on the surface of the photocatalytic material, and improve its photocatalytic degradation efficiency.

Figure 4:
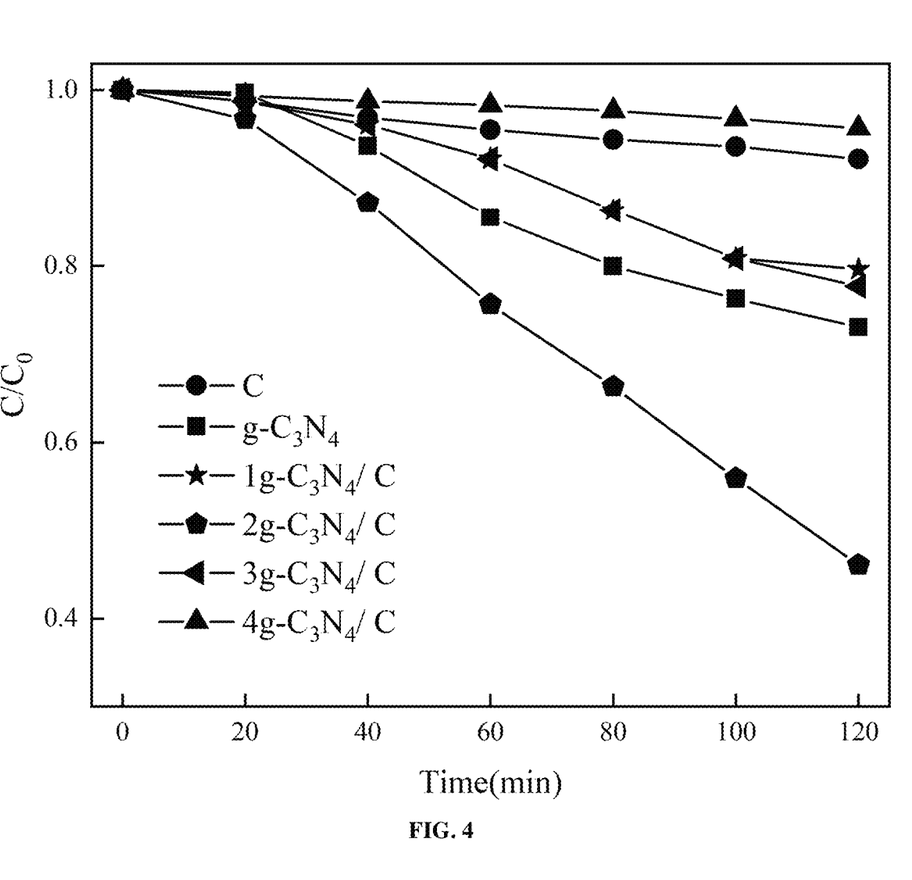
FIG. 4 is a curve chart of the visible light degradation of Rhodamine B (RhB) for different samples.
Figure 5:
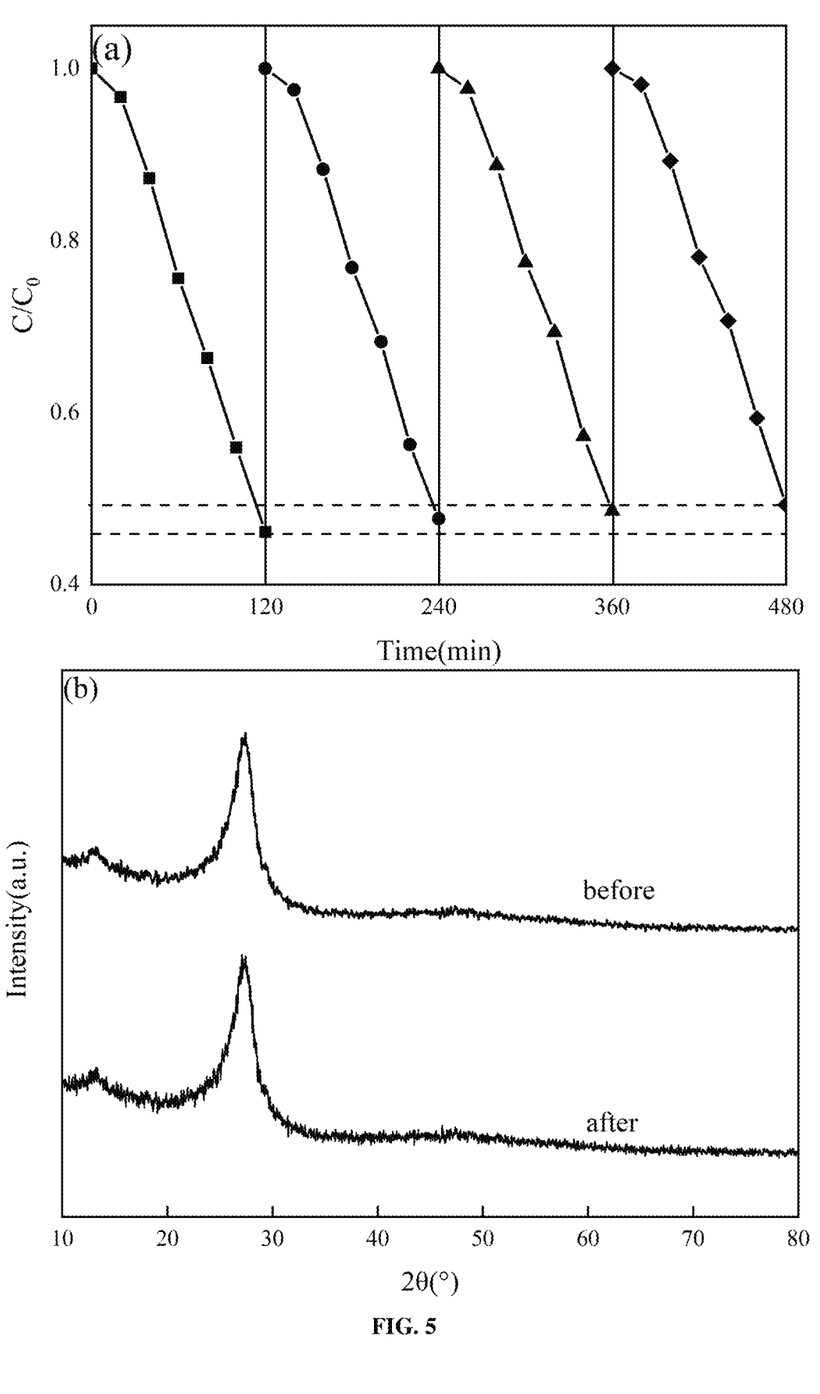

30 mg of the product was added to 100 mL of 20 mg/L Rhodamine B solution, samples were taken every 20 min under the xenon lamp simulated visible light irradiation, a UV-Vis spectrophotometer was used to analyze its concentration change in combination with the standard curve, and a photocatalytic degradation efficiency curve was plotted. As shown in FIG. 4, its degradation rate reaches 53.91% at 120 min after illumination. The cyclic experiment results in FIG. 5 show that the photocatalytic activity of the g-$C_3N_4$/C composite material decreases insignificantly after four cycles of the catalytic degradation, and there is no significant difference between the XRD patterns of the catalysts before and after the catalytic reaction.

Figure 6:
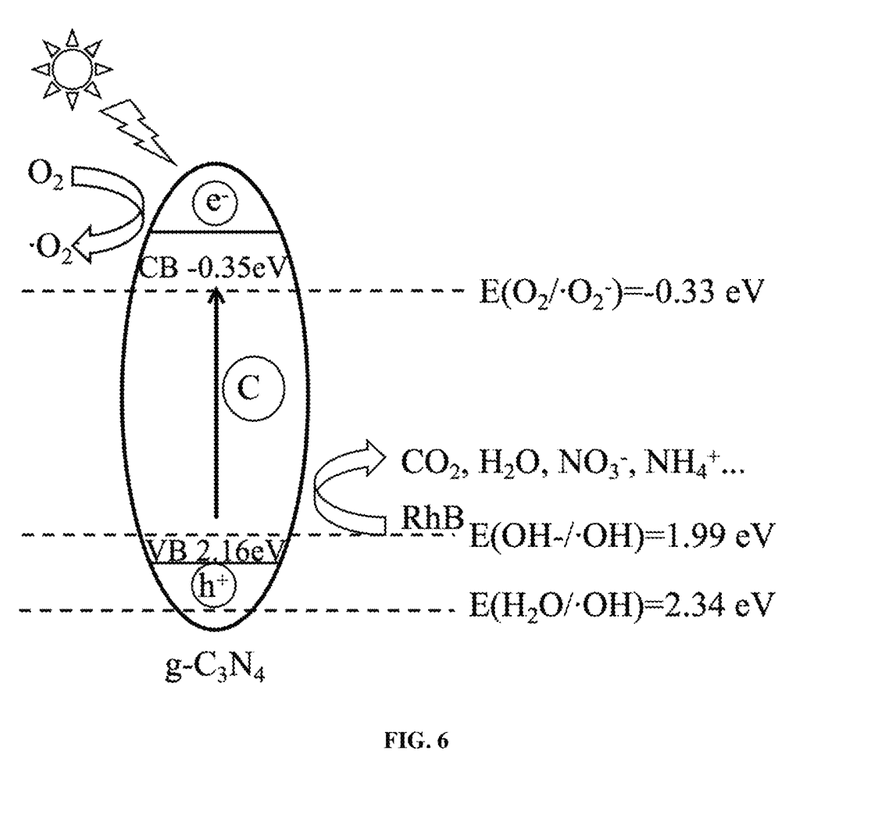
FIG. 6 illustrates the principle of the photocatalysis of a g-$C_3N_4$/C composite material.

The photocatalytic mechanism diagram (FIG. 6) shows that in the g-$C_3N_4$ photocatalytic material, the carbon skeleton formed by the calcination of hollyhock stalk acts as an electron transfer mediator that provides an electron transfer channel for photogenerated carriers, thereby reducing the recombination efficiency of photo-induced electrons and photogenerated holes and improving the efficiency of photocatalytic degradation of organic dyes in the system. Meanwhile, the carbon skeleton further provides a rigid support for the microscopic morphology of the material, so that it can maintain a high specific surface area. Thus, there are more active sites for chemical reactions, and the photocatalytic degradation efficiency is further improved.

Example 2

(1) Washed hollyhock stalks were cut into segments (5 cm), soaked in a pretreatment solution (the volume ratio of water to ethanol was 1:2, the solution was adjusted to pH 2 with 0.1 mol/L dilute hydrochloric acid, and the soaking time was 3-4 weeks) to remove chlorophyll and bioactive substances therein; after soaking, the stalks were washed with deionized water and dried naturally, direct sunlight was avoided, and dried stalks were collected for later use;

(2) 1.5 g of pretreated dry hollyhock stalks and 1.5 g of dicyandiamide were dissolved in 50 mL of deionized water, and stirred in a 50° C. water bath for 1 h; stirring was stopped until the dicyandiamide was completely dissolved; the mixture was held in the 50° C. water bath for 24 h, transferred to an alumina crucible and dried at 80° C. overnight;

(3) the resulting solid was placed in a muffle furnace, heated to 520° C. at 4° C./min in an air atmosphere and held for 6 h, calcinated and then ground to obtain a g-$C_3N_4$/C composite material.

Example 3

(1) Washed hollyhock stalks were cut into segments (4 cm), soaked in a pretreatment solution (the volume ratio of water to ethanol was 1:2, the solution was adjusted to pH 3 with 0.1 mol/L dilute hydrochloric acid, and the soaking time was 3-4 weeks) to remove chlorophyll and bioactive substances therein; after soaking, the stalks were washed with deionized water and dried naturally, direct sunlight was avoided, and dried stalks were collected for later use;

(2) 1.5 g of pretreated dry hollyhock stalks and 6.0 g of dicyandiamide were dissolved in 50 mL of deionized water, and stirred in a 50° C. water bath for 1 h; stirring was stopped until the dicyandiamide was completely dissolved; the mixture was held in the 50° C. water bath for 24 h, transferred to an alumina crucible and dried at 60° C. overnight;

(3) the resulting solid was placed in a muffle furnace, heated to 500° C. at 5° C./min in an air atmosphere and held for 6 h, calcinated and then ground to obtain a g-$C_3N_4$/C composite material.

What is claimed is:

1. A synthesis method of a g-$C_3N_4$/C composite material based on a hollyhock stalk, comprising the following steps:

step 1, pretreatment of hollyhock stalks cutting freshly picked hollyhock stalks into segments, washing stalk segments with deionized water, and soaking the stalk segments in a pretreatment solution to remove chlorophyll and bioactive substances therein; after soaking, washing the stalks with deionized water and drying naturally, avoiding direct sunlight, and collecting dried stalks for later use;

step 2, fabrication of the g-$C_3N_4$/C composite material using dicyandiamide as a precursor to prepare an impregnation solution, impregnating the stalks pretreated in step 1 in the impregnation solution for treatment, and conducting dehydration and heat treatment to generate the g-$C_3N_4$/C composite material, wherein the hollyhock stalks and the dicyandiamide have a mass ratio of (1:1)-(1:4).

2. The synthesis method according to claim 1, wherein the stalk segments in step 1 are 3-5 cm in length.

3. The synthesis method according to claim 1, wherein the pretreatment solution in step 1 is a mixture of water and ethanol in a volume ratio of (1:1)-(1:2) and the pretreatment solution is adjusted to a pH of 2-3 with 0.1 mol/L dilute hydrochloric acid; soaking time is 3-4 weeks; after soaking, the stalks are washed until a pH value of a washing solution is neutral prior to air-drying.

4. The synthesis method according to claim 1, wherein the stalks pretreated in step 2 are stirred in the impregnation solution in a 50° C. water bath for 1-2 h, stirring is stopped after the precursor is completely dissolved, and the stalks are kept holding in the water bath for 20-24 h and dried at 60-80° C. overnight.

5. The synthesis method according to claim 1, wherein the heat treatment in step 2 is conducted in a muffle furnace, and reaction conditions are as follows: heating to 500-550° C. at 3-5° C./min in an air atmosphere and holding for 4-6 h.

* * * * *